US005402688A

United States Patent [19]

Okada et al.

[11] Patent Number: 5,402,688

[45] Date of Patent: Apr. 4, 1995

[54] METHOD AND APPARATUS FOR DETERMINING THE TIGHTENED CONDITION OF A PIPE JOINT

[75] Inventors: Yoshitora Okada, Wakayama; Shouji Yakugawa, Kainan, both of Japan; Michihiko Iwamoto, Houston, Tex.

[73] Assignee: Sumitomo Metal Industries, Ltd., Osaka, Japan

[21] Appl. No.: 32,650

[22] Filed: Mar. 17, 1993

[51] Int. Cl.[6] .................. G01L 5/24

[52] U.S. Cl. .................. 73/862.23; 73/862.21; 73/862.24

[58] Field of Search .................. 73/862.21, 862.23, 862.24; 364/506, 508

[56] References Cited

U.S. PATENT DOCUMENTS

| | | | |
|---|---|---|---|
| Re. 34,063 | 9/1992 | Vincent et al. | 73/862.23 |
| 4,023,406 | 5/1977 | Benz, Jr. | 73/862.24 |
| 4,091,451 | 5/1978 | Weiner et al. | 364/506 |
| 4,102,182 | 7/1978 | Brown et al. | 73/862.24 X |
| 4,176,436 | 12/1979 | McCombs et al. | 73/862.23 X |
| 4,210,017 | 7/1980 | Motsinger | 364/506 X |
| 4,259,869 | 4/1981 | Carlin | 73/862.24 X |
| 4,365,402 | 12/1982 | McCombs et al. | 73/862.23 X |
| 4,375,120 | 3/1983 | Sigmund | 364/508 X |
| 4,400,785 | 8/1983 | Wallace et al. | 73/862.24 X |
| 4,402,052 | 8/1983 | Stone et al. | 364/506 |
| 4,446,745 | 5/1984 | Stone et al. | 364/506 X |
| 4,515,020 | 5/1985 | Plaquin | 73/761 |
| 4,700,576 | 10/1987 | Grare et al. | 73/862.21 X |
| 4,738,145 | 4/1988 | Vincent et al. | 73/862.23 |
| 4,768,388 | 9/1988 | Fader et al. | 364/508 X |
| 4,791,816 | 12/1988 | Grare et al. | 73/862.21 X |
| 4,894,767 | 1/1990 | Doniwa | 73/862.23 X |
| 5,130,700 | 7/1992 | Annis et al. | 364/508 X |
| 5,131,130 | 7/1992 | Eshghy | 73/862.23 X |
| 5,315,501 | 5/1994 | Whitehouse | 73/862.23 X |
| 5,321,506 | 6/1994 | Sargent | 73/862.23 X |

FOREIGN PATENT DOCUMENTS

| | | |
|---|---|---|
| 58-165972 | 10/1983 | Japan . |
| 63-229272 | 9/1988 | Japan . |
| 3-54430 | 3/1991 | Japan . |

*Primary Examiner*—Richard E. Chilcot, Jr.
*Assistant Examiner*—Dougherty Elizabeth L.
*Attorney, Agent, or Firm*—Burns, Doane, Swecker & Mathis

[57] ABSTRACT

During the period from the start until the completion of tightening of a pipe joint, the tightening torque applied to the pipe joint and the number of turns are sampled at prescribed intervals and stored. After the completion of tightening, a differential calculation is performed with respect to the stored data to determine the rate of change of the tightening torque with respect to the number of turns. Next, a reference value and the previously determined differentials are compared in the reverse order from storing, i.e., going backwards from the value corresponding to the completion of tightening. Based on this comparison, the stored data corresponding to the differential value which first falls below the reference value are made the tightening torque and the number of turns at the transition point, and the tightened condition is assessed based on whether the tightening torque and/or the number of turns at the transition point are in prescribed ranges.

10 Claims, 4 Drawing Sheets

METHOD AND APPARATUS FOR DETERMINING THE TIGHTENED CONDITION OF A PIPE JOINT

BACKGROUND OF THE INVENTION

This invention relates to a method and apparatus for determining whether a pipe joint is properly connected. More particularly, it relates to a method and apparatus for determining the tightened condition of a pipe joint for connecting sections of oil well pipe.

Pipe joints for oil well pipes must be able to form a joint capable of resisting the high pressures which develop inside the pipes. From in the past, a threaded pipe joint like that shown in FIG. 4 which creates a seal by metal-to-metal contact has been used to connect oil well pipe.

The pipe coupling 1 is a cylindrical member having female threads 10,10 formed at both ends for prescribed lengths on its inner periphery. Adjoining the female threads 10,10 are tapered seal surfaces 11,11 which decrease in diameter towards the lengthwise center of the pipe coupling 1. Shoulder surfaces 12,12 which adjoin the seal surfaces 11,11 extend roughly perpendicular to the longitudinal axis of the pipe coupling 1. A pipe 2 to be connected to this pipe coupling 1 has at its end portion an end surface 22 which is roughly perpendicular to the longitudinal axis of the pipe 2, a seal surface 21 which adjoins the outer periphery of the end surface 22 and has a taper corresponding to the seal surfaces 11 of the pipe coupling 1, and a male thread 20 which adjoins the seal surface 21 and is shaped to engage with the female threads 10 of the pipe coupling 1. The joining of the pipe coupling 1 and the pipe 2 is performed by placing the inside of the pipe coupling 1 over the end of the pipe 2 and then rotating the pipe coupling 1 about its longitudinal axis to screw the male threads 20 of the pipe 2 into the female threads 10 of the pipe coupling 1. FIG. 5 is an enlarged view of an assembled joint. As shown in this figure, when the coupling 1 and the pipe 2 are properly joined, the seal surface 11 on the inner periphery of the pipe coupling 1 and the seal surface 21 on the outer periphery of the pipe 2 are in intimate contact along their entire lengths to form a cylindrical seal. Furthermore, the shoulder surface 12 of the pipe coupling 1 abuts against the end surface 22 of the pipe 2 and is in intimate contact therewith to form a shoulder seal. Due to both seals, the joint has a high sealing integrity.

The joining of the pipe coupling 1 to the pipe 2 is carried out by a tightening machine equipped with a rotating chuck that holds the pipe coupling 1 and rotates it about its longitudinal axis and a fixed chuck that secures the pipe 2 on the same axis. As the coupling 1 and the pipe 2 are being screwed together, the tightening torque which is applied to the pipe coupling 1 through the rotating chuck is detected, and when the detected value reaches a prescribed final tightening torque level, the operation of the tightening machine is stopped, and the joining of the coupling 1 and the pipe 2 is completed. As a result, the pipe coupling 1 and the pipe 2 are fastened within a tightening torque within a prescribed range of the final tightening torque.

FIG. 6 is a graph showing the variation of the tightening torque applied to the pipe coupling 1 during joining. In this figure, the horizontal axis indicates the number of turns of the pipe coupling 1. When tightening is properly carried out, as shown in the figure, the tightening torque at first gradually increases with an increase in the number of turns, and midway through it rapidly increases towards the final tightening torque. The transition from the gradual increase region to the rapid increase region occurs when the shoulder surface 12 of the pipe coupling 1 abuts against the end surface 22 of the pipe 2. Thus, the tightening torque applied to the pipe coupling 1 during the region of gradual increase is mainly consumed in overcoming the frictional resistance between the female threads 10 and the male threads 20 and between seal surface 11 and seal surface 21. In contrast, in the region of rapid increase, the tightening torque is mainly consumed in pressing the shoulder surface 12 against the end surface 22.

Accordingly, by determining whether the coordinates of the transition point A from the gradual increase region to the rapid increase region are suitable, and in particular, by determining whether the number of turns of the pipe coupling 1 and the tightening torque at transition point A are both within appropriate ranges, it can be determined whether the joint is properly tightened.

For example, in the process of tightening, if galling takes place between the female threads 10 and the male threads 20, at the time of galling, the tightening torque will rapidly increase, so the torque will vary as shown by the dashed line in FIG. 6. On the other hand, when the tightening between the female threads 10 and the male threads 20 and between seal 11 and seal 21 is larger than appropriate, the frictional resistance will be large, so the slope will be large in the region of gradual increase. Therefore, the torque will vary as shown by the long and short dashed line in FIG. 6. In either case, the final tightening torque is obtained before a suitable number of turns of the coupling 1 have taken place, and in the completed joint, there will be no contact or insufficient contact between the shoulder surface 12 of the coupling 1 and the end surface 22 of the pipe 1. Therefore, a desired seal will not be obtained. As shown in FIG. 6, if the joint is not properly tightened, the transition point will be in a location much different in the figure from the correct transition point A, so a bad joint can be recognized and rejected.

As described above, in general, the tightening torque and the number of turns during tightening are continuously sensed by a torque detector and a turn detector mounted on a joining machine. The sensed values are displayed in the form of a graph or a table, and a human operator watching the display determines whether the joint is properly made up or not. However, this arrangement has the problem that it requires a full-time operator, so it is uneconomical with respect to labor costs. Furthermore, the result of evaluation will differ from operator to operator, so consistent results can not be obtained.

In order to automate determination of the tightened condition of a pipe joint and thereby realize labor savings, in Japanese Published Unexamined Patent Application No. 63-229272, No.58-165972, and No.3-54430 a method is proposed in which values sensed by a torque detector are sampled at minute time intervals from the start of joining of a coupling and a pipe. The difference between the sampled torque at two points in time is computed in real time, and the transition point A is determined to have been reached when the difference exceeds a predetermined reference value. Based on whether the tightening torque at the transition point is within suitable ranges, the quality of the joint is determined.

However, in the gradual increase region prior to the transition point A, the tightening torque may fluctuate due to various disturbances, such as the entry of an impurity between the female threads 10 and the male threads 20. Therefore, the tightening torque may not increase smoothly and may fluctuate as shown in FIG. 6. Therefore, when the transition point is determined by the method described in Japanese Published Unexamined Patent Application No. 63-229272, for example, a small fluctuation in the torque curve in the gradual increase region may be mistaken for the transition point A, and the determination of the quality of the pipe joint would be incorrect. Furthermore, when the rotational speed varies during the tightening operation, the rate of change of the tightening torque with respect to time will also vary. So, the accuracy of the determination of the transition point by this method is poor. Therefore, the reliability of this method is extremely low.

SUMMARY OF THE INVENTION

It is an object of the present invention to provide a determining method which can automatically and accurately assess the tightened condition of a pipe joint.

It is another object of the present invention to provide an apparatus for use in carrying out this method.

In the present invention, during the period from the start until the completion of tightening of a pipe joint, the tightening torque applied to the pipe joint and the number of turns are sampled at prescribed intervals and stored. After the completion of tightening, a differential calculation is performed with respect to the stored data to determine the rate of change of the tightening torque with respect to the number of turns. Next, a reference value and the previously calculated differentials are compared in the reverse order from storing, i.e., going backwards from the value corresponding to the completion of tightening. Based on this comparison, the stored data corresponding to the differential value which first falls below the reference value are made the tightening torque and the number of turns at the transition point, and the tightening condition is assessed based on whether the tightening torque and/or the number of turns at the transition point are in prescribed ranges.

The tightening torque and the number of turns can be sampled at prescribed time intervals, or the tightening torque can be sampled every prescribed number of turns.

The reference value which is compared with the differentials in the prescribed region can be a value which is calculated based on the values of the calculated differentials in the prescribed region, or it can be a value which is calculated prior to tightening based on parameters such as the characteristics of the pipe and the coupling.

DESCRIPTION OF THE PREFERRED EMBODIMENTS

Figure 1:
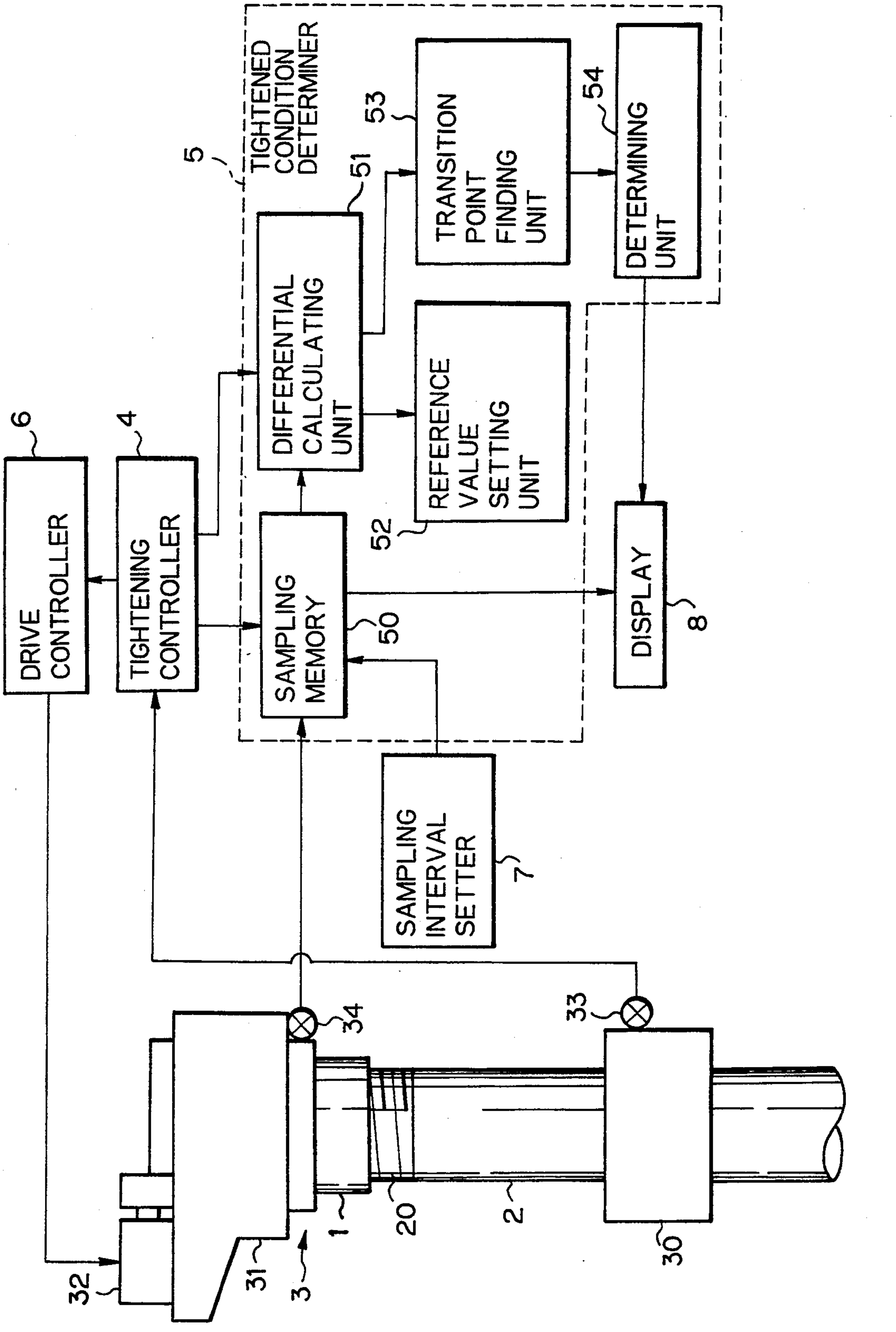
FIG. 1 is a block diagram of an embodiment of an apparatus according to the present invention.

A preferred embodiment of the present invention will now be described while referring to the accompanying drawings. FIG. 1 is a block diagram of an embodiment of a determining apparatus according to the present invention.

Figure 4:
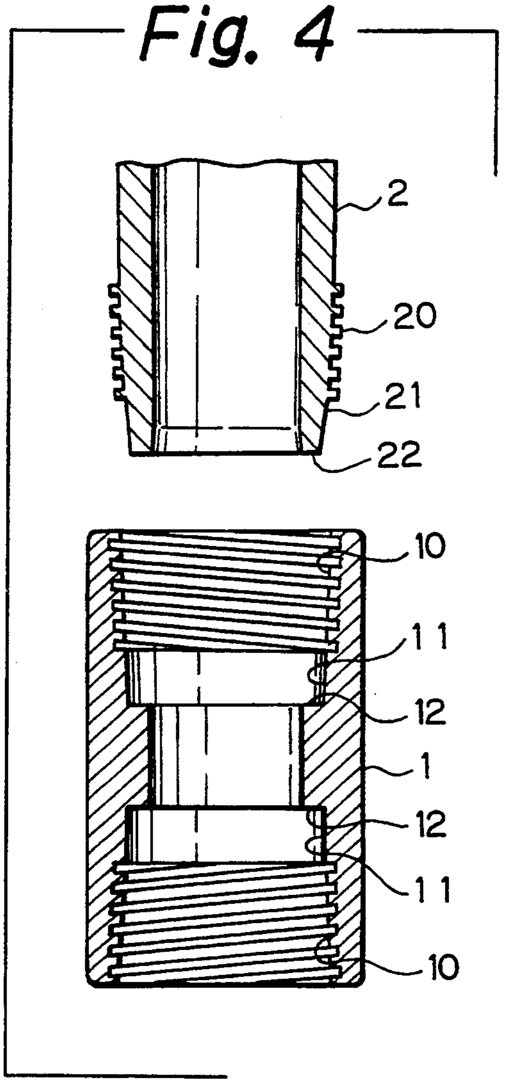
FIG. 4 is a cross-sectional view of a pipe coupling and a pipe to which the present method can be applied.
Figure 5:
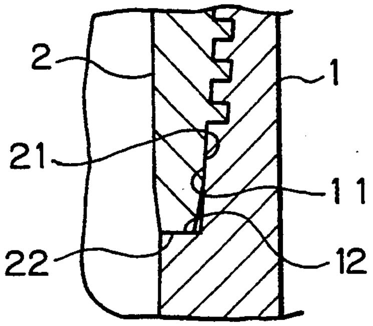
FIG. 5 is an enlarged cross-sectional view of a pipe joint.
Figure 6:
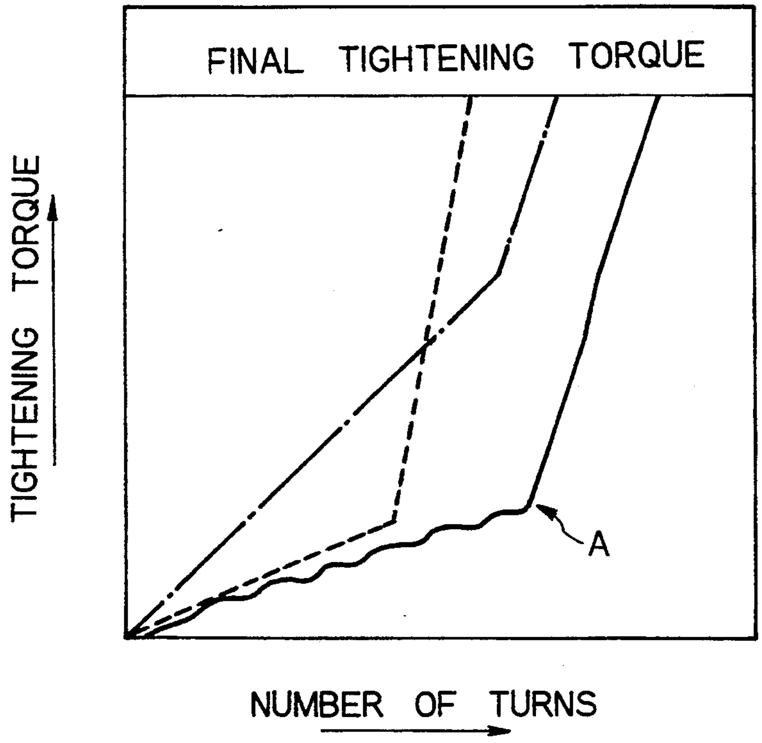
FIG. 6 is a graph of tightening torque as a function of the number of turns during tightening of a pipe joint, showing different modes of variation of the tightening torque.

In the figure, 1 is a pipe coupling and 2 is a pipe connected to the pipe coupling 1. These each have the structure described previously with respect to FIG. 4. The pipe coupling 1 and the pipe 2 are mounted on tightening machine 3 equipped with a coaxially disposed fixed chuck 30 and a rotating chuck 31. The coupling 1 and the pipe 2 are automatically joined by the tightening machine 3 to form a pipe joint. The tightening machine 3 firmly grips the pipe coupling 1 with the rotating chuck 31 .and it firmly grips the pipe 2 near its end with the fixed chuck 30. After both the coupling 1 and the pipe 2 are coaxially disposed, a drive motor 32 is energized to rotate the rotating chuck 31, and the pipe coupling 1 is rotated around its axis and made to approach the pipe 2. As a result, the female threads 10 formed in the inner periphery of the coupling 1 (see FIG. 4) are screwed onto the male threads 20 formed on the outer periphery of the end of pipe 2, and the pipe coupling 1 and the pipe 2 are joined together. At this time, the tightening torque applied to the pipe coupling 1 and the total number of turns of the pipe coupling 1 from the start of joining are respectively detected by a torque detector 33 mounted on the fixed chuck 30 and a turn detector 34 mounted on the rotating chuck 31. The torque detected by the torque detector 33 is provided to a tightening controller 4 which controls the operation of the tightening machine 3, and the number of turns detected by the turn detector 34 and the detected torque are provided to a tightened condition determiner 5 which determines the quality of the tightened condition of the joint in accordance with the present method.

The tightening controller 4 uses the torque detected by the torque detector 33 as a feedback signal and it generates a drive command for a drive controller 6. In accordance with the drive command, the drive controller 6 adjusts the drive current for the drive motor 32 of the rotating chuck 31 so that enough tightening torque to overcome the resistance between the threads during tightening is applied to the joint. When the torque detected by the torque detector 33 reaches a predetermined final tightening torque level, the drive command to the drive controller 6 is stopped, and the drive controller 6 cuts off the supply of current to the drive motor 32 and the tightening of the coupling 1 onto the pipe 2 is stopped. As a result of the above operation, the pipe coupling 1 and the pipe 2 are joined such that the final tightening torque is within the above-described range of final tightening torque.

The drive command generated by the tightening controller 4 is also provided to the tightened condition determiner 5, and the tightened condition determiner 5 determines the tightened condition in a manner to be described below.

As shown in FIG. 1, the tightened condition determiner 5 is equipped with a sampling memory 50, a differential calculating unit 51, a reference value setting unit 52, a transition point finding unit 53, and a determining unit 54. The drive signal generated by the tightening controller 4 is provided to the sampling memory 50 and the differential calculating unit 51, and the detected signals from the torque detector 33 and the turn detector 34 are provided to the sampling memory 50. The sampling memory 50 samples the tightening torque and the number of turns detected by the torque detector 33 and the turn detector 34 at prescribed intervals while a drive signal is being applied by the tightening controller 4, i.e., while the tightening operation is being carried out by the tightening machine 3. The sampled torque and number of turns are stored as an associated pair. The length of the sampling interval can be freely varied by manual operation of a sampling interval setter 7 disposed outside the tightened condition determiner 5. The sampling interval of the sampling memory 50 can be suitably set in accordance with the length of threaded portions in engagement with each other, the desired accuracy of determination, and the joining conditions. If sampling takes place n times during the tightening operation, n pairs of data values for the tightening torque and the number of turns are obtained and stored, as shown by the • marks in FIG. 2.

The sampling intervals can be constant time intervals, or each interval can correspond to a constant, minute number of turns of the coupling 1 as detected by the turn detector 34.

Figure 2:
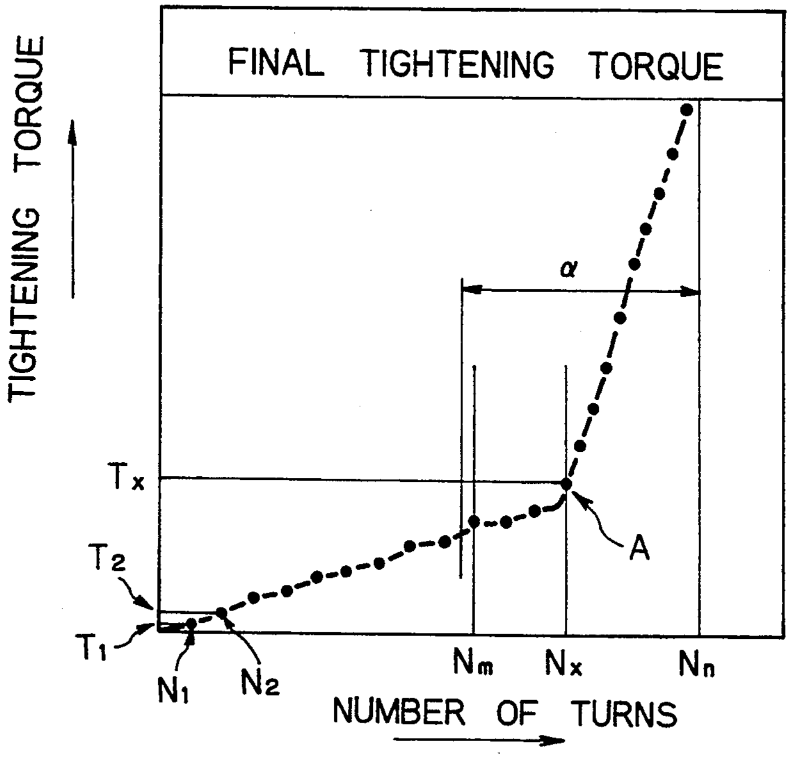
FIG. 2 is a graph of tightening torque as a function of the number of turns during tightening of a pipe joint.

The differential calculating unit 51 begins operation after stopping the drive command from the tightening controller 4, i.e., upon the end of the tightening operation by the tightening machine 3. First, it reads out all the n pairs of stored data stored in the sampling memory 50. It then finds the data pair for which the number of turns is smaller than the number of turns $N_n$ for the nth data pair obtained just prior to the end of the tightening operation by a prescribed value $\alpha$. As shown in FIG. 2, if the above conditions are satisfied by the mth pair of stored data, i.e., if $N_n - N_m < \alpha$, then the $(n - m + 1)$ pairs of stored data from the mth pair to the nth pair are selected, and subsequent processing is carried out on these data pairs. The prescribed value $\alpha$ is selected so that on a graph showing the expected variation in tightening torque when appropriate tightening takes place, the transition point A will fall within the selected range. Subsequent processing is carried out within a range including the entire region of rapid increase and a portion of the region of gradual increase.

After data to be processed are selected in this manner, the differential calculating unit 51 calculates the differentials $X_1$ by the following equation:

$$X_i = \frac{T_i - T_{i-1}}{N_i - N_{i-1}} \qquad (1)$$

Figure 3:
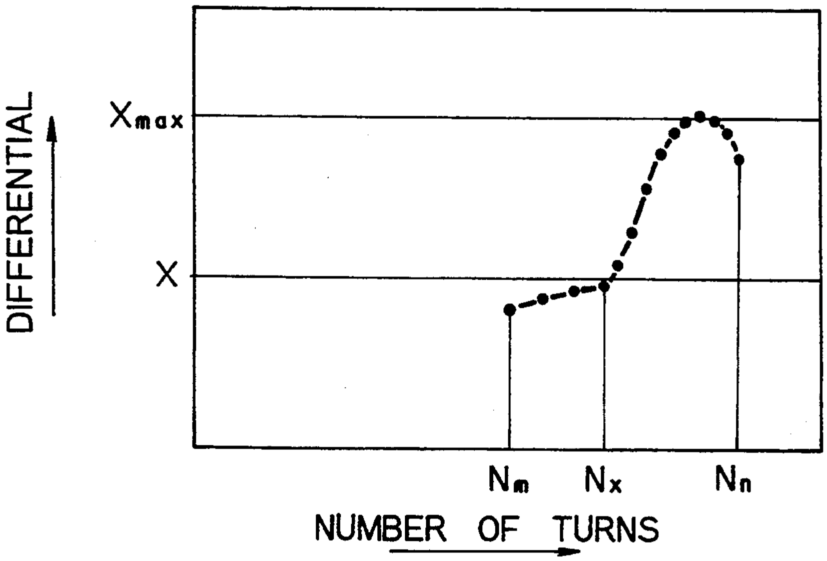
FIG. 3 is a graph showing an example of differentials calculated from the data in FIG. 2.

Each calculated differential $X_1$ approximately corresponds to the rate of change of the fastening torque with respect to the number of turns at the time of the ith sampling, or in other words, the slope of the curve in FIG. 2 at the point $(N_1, T_1)$. The calculated values are provided to the reference value setting unit 52 and the transition point fining unit 53. In the reference value setting unit 52, the largest value $X_{max}$ of the $(n-m)$ differentials $X_1$ provided by the differential calculating unit 51, i.e., the largest value for the rate of change of the tightening torque within the processing range is found. Then, $X_{max}$ is multiplied by a previously determined coefficient to obtain a reference value X, which serves as a reference for finding the transition point A, and the reference value X is provided to the transition point finding unit 53. The coefficient is an empirical constant determined by the results of actual tightening operations. It varies in accordance with the type of threaded joint, the internal diameter, and other characteristics of the pipe coupling 1 and on the joining conditions. FIG. 3 is a graph of one example of the differential $X_1$ calculated by Equation (1) as a function of the number of turns. As shown in this figure, the differential $X_1$ generally rapidly increases upon entry into the region of rapid increase, and just before the completion of tightening, when the drive current for the drive motor 32, i.e., the rotational speed for the rotating chuck 31, is gradually decreased in preparation for the stopping of the tightening machine 3, the differential $X_1$ tends to somewhat decrease. In this case, the maximum value $X_{max}$ and the reference value X are set as shown in the drawing, and $X_{max}$ of course exists in the region of rapid increase.

In the transition point finding unit 53, the differential data within the processing range provided by the differential calculating unit 51 and the reference value X set in the reference value setting unit 52 are compared in the reverse order from which data was stored in the sampling memory 50, i.e., starting with the differential $X_n$ corresponding to the last stored data set and working backwards, and the differential which first falls below the reference value X is found. The stored data corresponding to this differential are read out from the differential calculating unit 51, and this stored data is provided to the determining unit 54 as corresponding to the transition point A. For example, if the differential data shown in FIG. 3 are obtained, in the transition point finding unit 53, the number of turns $N_x$ corresponding to the first differential which is below the reference value X is first determined, and the tightening torque $T_x$ corresponding to this number of turns $N_x$ is determined as shown in FIG. 2. These values are provided to the determining unit 54 as the number of turns and the tightening torque at the transition point A. The determining unit 54 determines that the tightened condition of the pipe joint is good when these values are within prescribed suitable ranges for the tightening torque and the number of turns. If they are not within the suitable ranges, the tightened condition is determined to be bad. The result of determination is provided to a display 8 and is displayed on the display 8. As shown in FIG. 1, the data stored in the sampling memory 50 is also provided to the display 8, and all the stored data can be displayed together with the result of determination by the determining unit 54.

Instead of determining the quality of the joint based on whether both the tightening torque and the number of turns at the transition point are within prescribed ranges, it is possible to make a determination of joint quality based on only one of the tightening torque and the number of turns at the transition point.

In the processing range shown in FIG. 2 in which the differentials are compared with the reference value X, the tightening torque changes in a stable manner and does not have the fluctuations which sometimes occur in the region of gradual increase. Furthermore, the determination of the transition point is not influenced by the change of rotational speed, because the differential corresponds to the rate of change of the tightening torque with respect to the number of turns. Accordingly, there is no fear of mistaken determination of the transition point such as occurs with prior art methods, so the reliability of determination of the tightened condition of a joint is increased.

In Equation (1), the differential $X_1$ gives the slope between adjacent data points on the curve in FIG. 2. However, a different formula can be used to calculate the differential. For example, the differential could give the slope between every other data point, as given by the following formula:

$$X_i = \frac{T_i - T_{i-2}}{N_i - N_{i-2}} \qquad (2)$$

Differentials calculated by Equation (2) would be used in the same manner as differentials calculated by Equation (1).

The reference value X which is compared with the differentials to determine the transition point A need not be a function of the actual differentials calculated by the differential calculating unit 51, and it could be a coefficient multiplied by an optimum value for the tightening torque at the completion of tightening. The optimum value could be determined in advance based on the characteristics of the pipe and the pipe coupling being joined, such as the pipe size, the grade, the thread shape, and the like.

It can be seen that the tightened condition of a pipe joint can be automatically determined without the need for any human operator, so the apparatus and method of the present invention result in labor savings. Furthermore, since the method of the present invention does not require any human decision making, the results of determination are accurate and reproducible.

It will be appreciated by those skilled in the art that numerous variations and modifications may be made to the invention as described above with respect to specific embodiments without departing from the spirit or scope of the invention as broadly described.

What is claimed is:

1. A method of determining a final tightened condition of a pipe joint between a pipe coupling having a shoulder and a pipe, the method comprising the steps of:

(a) screwing a pipe coupling onto a pipe to a predetermined final tightening torque level;

(b) during said step (a) measuring a torque applied to the pipe coupling and the pipe and the number of turns of the pipe coupling relative to the pipe from a starting point during said step (a) at intervals to an end point during said step (a) to obtain a plurality of data sets, each data set comprising a torque and an associated number of turns, the data sets being obtained in a first order;

(c) after completion of said step (b), calculating a differential for a plurality of the data sets indicating a rate of change of the torque with respect to the number of turns;

(d) comparing the differentials corresponding to the data sets with a reference value in an order reversed from the first order to select a differential which first has a value below the reference value; and (e) determining the final tightened condition for the pipe joint based on the data set corresponding to the selected differential.

2. A method as claimed in claim 1 wherein the data sets include a final data set, and the differentials are calculated for data sets within a prescribed number of turns of the number of turns of the final data set.

3. A method as claimed in claim 1 wherein the final tightened condition of the pipe joint is determined based on whether the torque corresponding to the selected differential is within a prescribed range.

4. A method as claimed in claim 1 wherein the final tightened condition of the pipe joint is determined based on whether the number of turns corresponding to the selected differential is within a prescribed range.

5. A method as claimed in claim 1 wherein the reference value corresponds to a maximum one of the differentials multiplied by a coefficient.

6. A method as claimed in claim 1 wherein the reference value is an optimum final tightening torque multiplied by a coefficient.

7. An apparatus for determining the tightening condition of a pipe joint between a pipe coupling having a shoulder and a pipe comprising:

measuring means for measuring a torque applied to the pipe coupling and the pipe and the number of turns of the pipe coupling relative to the pipe from a starting point at intervals as the pipe coupling is being screwed onto the pipe to obtain a plurality of data sets, each data set comprising a torque and an associated number of turns, the data sets being obtained in a first order;

differential calculating means, for calculating a differential for a plurality of the data sets indicating a rate of change of the torque with respect to the number of turns;

comparing means for comparing the differentials corresponding to the data sets with a reference value in reverse order from the first order to select a differential which first has a value below the reference value; and determining means for determining the tightened condition of the pipe joint based on the data set corresponding to the selected differential.

8. An apparatus as claimed in claim 7 wherein the differential calculating means calculates the differentials for data sets within a prescribed number of turns of the number of turns of the final data set.

9. An apparatus as claimed in claim 7 wherein the determining means determines the tightened condition of the pipe joint based on whether the torque corresponding to the selected differential is within a prescribed range.

10. An apparatus as claimed in claim 7 wherein the determining means determines the tightened condition of the pipe joint based on whether the number of turns corresponding to the selected differential is within a prescribed range.

* * * * *